Aug. 14, 1923.
O. F. STAFFORD
1,464,732
COOLING AND STABILIZING CHARCOAL
Filed Aug. 19, 1920
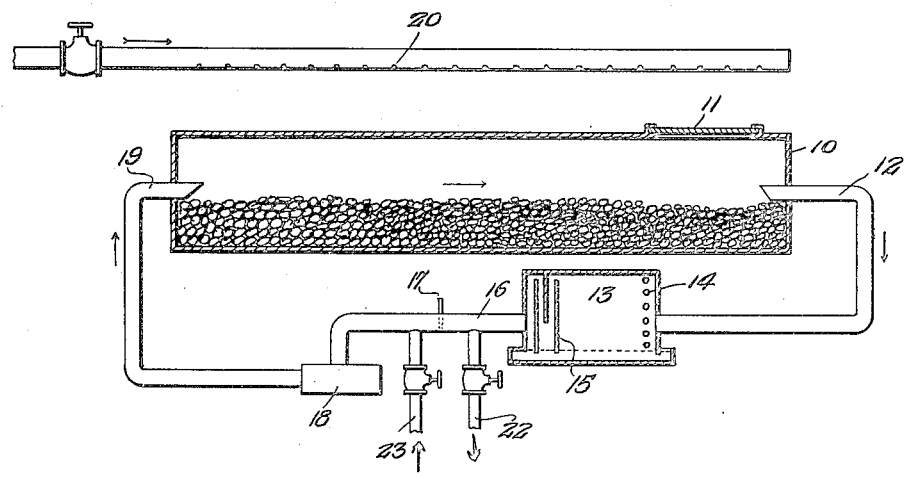

Patented Aug. 14, 1923.

1,464,732

UNITED STATES PATENT OFFICE.

ORIN F. STAFFORD, OF EUGENE, OREGON.

COOLING AND STABILIZING CHARCOAL.

Application filed August 19, 1920. Serial No. 404,500.

*To all whom it may concern:*

Be it known that I, ORIN F. STAFFORD, a citizen of the United States of America, residing at Eugene, Oregon, have invented certain new and useful Improvements in Cooling and Stabilizing Charcoal, of which the following is a specification.

The present invention relates to an improved process for stabilizing or quick-ageing charcoal, whereby hot charcoal is converted into a state in which it can readily be handled and shipped or stored with complete safety, as regards fire risk.

It is well known that charcoal when first prepared, and while in a hot condition, if exposed to air, will quickly take fire and burn, and if sufficient quantities of air have access to the mass of charcoal, the whole will be consumed. It is also well known that when charcoal as made, is first cooled down to atmospheric temperature, and then allowed to stand in contact with atmospheric air, a considerable amount of oxygen may combine with the charcoal to liberate a considerable amount of heat which, in some cases, may be sufficient to set the charcoal on fire. This danger has been recognized by the railroads and the railroads will not permit charcoal, when freshly prepared, to be loaded into freight cars for shipment until the charcoal has been allowed to stand in free contact with air for a considerable period, depending upon the sizes of the lumps or pieces of charcoal. Charcoal in the form of large lumps, owing to the better circulation of air permitted through a pile of such coarse material, may attain the condition of stability very much quicker than charcoal in the form of small pieces.

In accordance with the present invention, the primary object is to put the finished charcoal into substantially stable condition in the shortest possible time with a minimum amount of handling, and the process will be described particularly in relation to finely-divided charcoal as produced, for example in accordance with the process of my U. S. Patent No. 1,380,262, corresponding with British Patents 119,040 and 141,505 and Canadian Patent 182,887 issued March 12, 1918, although the process of this invention is applicable also, to charcoal in larger pieces. In a preferred form of execution of the process of the present invention, the charcoal from the carbonization vessel in which it is formed is first placed in a suitable receptacle, preferably a receptacle in which it can be agitated or tumbled, whereby a gas can have access to the entire quantity of the charcoal. Such receptacle can initially be filled with ordinary air and in that event a small amount of the charcoal would burn, to produce an atmosphere consisting largely of carbon dioxid and nitrogen. Such an atmosphere is hereinafter referred to as an inert gas atmosphere. The receptacle into which the hot charcoal is dumped should, of course, be closed up as soon as possible after the charcoal has been placed therein. A current of the inert gas contained in the vessel is then caused to travel from such receptacle through a cooling device and back into such receptacle, a cyclic current of gas being preferable for reasons of economy. The gas may, for example, leave the upper part of the receptacle, be drawn through a tower in which it is brought into contact with water in the form of a spray, the excessive amount of spray carried by the gas may be removed by suitable baffles and the gas then reintroduced into the lower part of the receptacle. This operation is preferably continued until the temperature of the charcoal has fallen very materially, for example, it may be continued until the temperature of the charcoal pieces has fallen to about 200° C. While the charcoal in this condition could not safely be exposed to air or to gas containing approximately the percentage of free oxygen contained in air, it is safe to commence to gradually substitute air for the inert gas. For this purpose a small proportion of the inert gas can be drawn out of the circuit while a corresponding amount of air is allowed to enter the circuit and the cooling operation continued as above until the temperature of the charcoal has fallen to such an extent that the charcoal can be safely subjected to air containing its full quota of free oxygen.

Apparatus suitable for carrying out the present invention is shown diagrammatically in the annexed drawing, which shows a front view of the apparatus. A rotating cylindrical receptacle 10, is provided with a manhole and cover 11 for charging the material into the said receptacle. At 12, is shown a gas outlet leading to a cooler 13, the same being provided with suitable spray pipes 14, for spraying the gases with water. Baffles are shown at 15 around which the cooled gases travel and thence the gases pass through pipe 16. The said pipe is provided with an adjustable gate 17 for controlling the flow of gases therethrough. At 18 is shown a fan or blower for forcing gases through pipe 19, back into the rotary receptacle 10. Located above the receptacle is a pipe 20 provided with perforations along its lower edge, through which water may be dripped or sprayed upon the rotating receptacle to cool the same and the charcoal therein. When the mass of hot charcoal is first dumped into the rotary receptacle 10, the latter being filled with air initially, a small proportion of the charcoal at once burns, and the cover 11, is fixed in place. The air in the receptacle 10 is thereby converted into an inert atmosphere which quickly envelops the charcoal. The gases are withdrawn through pipe 12, and are treated in the cooler 13, then travel through pipe 16, fan 18 and pipe 19, back into the receptacle 10, until the charcoal has been cooled to the desired extent. The receptacle 10 is preferably rotated continuously during this cyclic flow of the gas. When the temperature of the charcoal has been reduced sufficiently, the valves in pipes 22 and 23 can be opened somewhat and the portion of the inert gas withdrawn through pipe 22, while a portion of air is introduced through pipe 23. The operation of the fan 18 is continued and the gate 17 is adjusted so as to cause a slight amount of pressure in that portion of the pipe 16 between the gate 17, and the cooler 13, and also to produce a slight suction in that portion of the pipe 16, between the gate 17 and the fan 18. This will cause leakage outward through the pipe 22, of a portion of the inert gas, while a corresponding amount of air will enter through pipe 23.

The oxidation of charcoal which has above been referred to, appears to be produced by the joint action of a number of different phenomena. Charcoal has relatively great absorptive properties and also has relatively great adsorptive properties, whereby the charcoal can take up and condense within its pores a relatively great quantity of oxygen. This operation proceeds more actively at low temperatures. Carbon unites with oxygen to form oxides and while charcoal possesses a slight capacity to unite with oxygen, at ordinary room temperature, with the production of oxides, this action proceeds at a much greater rate at higher temperatures. Thus there is a point intermediate between very low temperatures and the ignition temperature at which the said adsorptive properties are relatively great and the said tendency to oxidation is relatively great and there is a point at which the curves representing these two phenomena would cross each other. This point could be considered as the temperature at which stabilization or ageing of charcoal can take place at the maximum speed consistent with safety. The temperature at which it is possible safely to commence the introduction of some oxygen into the cyclic current of cooling gas may depend to a considerable extent on the particular kind of charcoal. Charcoal from hard wood and from soft wood, charcoal from sound wood and from partially decayed wood; charcoal from straw, cobs, peat, nut shells, husks, coal and the like differ somewhat in this respect. Likewise the temperature of the maximum speed of adsorption and slow oxidation also depends to some extent upon the particular kind of charcoal. The temperature at which the charcoal has been burned also has some effect on both of these temperatures. However, for ordinary wood charcoal the temperature at which the curves above referred to will cross may be found to be within the range of 40 to 100° C.

After having reduced the temperature of the charcoal after the commencement of the introduction of air into the flowing cyclic current of inert gas, the temperature of the charcoal is preferably brought down to about the range of maximum quickness of ageing of the charcoal, which, as above stated, may be around 40 to 100° C., and preferably to about 50 to 60° C. Air containing its full quota of oxygen can now be contacted with the charcoal while the latter is maintained within the temperature range above referred to, although for some purposes the ageing and stabilizing action can be sometimes quickened by alternately lowering and raising the temperature of the charcoal and of the air in contact therewith, thus for example, the temperature may be alternately dropped to any feasible lower temperature whereby the adsorption phenomenon will be favored, say to about ordinary room temperature, and then raised to temperatures considerably above the temperature of maximum adsorption, say up to 100° C., or so, in order to accelerate the chemical oxidation phenomenon, and hence the rate of "ageing."

By operating in the manner above referred to, it is possible to substantially completely stabilize fine charcoal of the character above specified within a few hours, so that in about 5 to 20 hours, after the charcoal leaves the kiln, a completely aged and completely stabilized charcoal is produced. With the methods heretofore proposed, a matter of many days (amounting perhaps to several weeks) would be necessary to secure this result.

While I have described the invention as applied to finely-divided charcoal, it is also applicable to charcoal in the form of large lumps, but in this latter case, it ordinarily would be inadvisable to tumble or agitate the mass, since such procedure would tend to unduly break up the large lumps of charcoal which are, for many purposes, more valuable than the fine material.

While I have referred to introducing the charcoal from the kiln into a receptacle initially containing air, it is, of course, possible to introduce the charcoal into a receptacle initially containing an inert gas instead of air, various kinds of gases can be used for this purpose, the gases produced in the destructive distillation of wood might be used, or if desired, ordinary chimney gas could be used.

I claim:

1. A process of cooling and stabilizing charcoal which comprises transferring hot charcoal from the device in which the same has been produced, into a closed receptacle, agitating the charcoal therein while passing a cyclic current of an inert gas, through a gas cooler and then through said receptacle in contact with such hot agitated charcoal, until the temperature of the charcoal has fallen to about the upper limit of the quick-ageing temperature range, then gradually substituting a gas containing a substantial percentage of oxygen for said inert gas, while maintaining the charcoal within the quick-ageing temperature range, and continuing to circulate the oxygen-containing gas while holding such temperature.

2. A process of cooling and quick-ageing hot charcoal, embracing the steps of contacting hot charcoal with a cool inert gas, until its temperature drops considerably, then gradually substituting an oxygen-containing atmosphere for said inert gas atmosphere, and holding the charcoal in contact with such oxygen-containing atmosphere while such charcoal is maintained at a quick-ageing temperature.

3. A process which comprises intimately contacting a cooled cyclic current of inert gas with hot charcoal until the temperature falls to a point within the range representing the quick-ageing temperature, gradually substituting air for such inert gas, while cooling the charcoal within such quick-ageing-temperature-range, and continuing to contact air with such charcoal until properly aged.

4. A process which comprises intimately contacting a cooled cyclic current of inert gas with hot charcoal until the temperature falls to a point within the range representing the quick-ageing temperature, gradually substituting air for such inert gas, while cooling the charcoal within such quick-ageing-temperature-range, and alternately raising and lowering the temperature between points representing a relatively rapid oxygen-fixation temperature and a relatively rapid oxygen-adsorption temperature, whereby ageing of the charcoal is accelerated.

5. A process which comprises introducing hot charcoal at above its kindling temperature, into a closable receptacle in which it is brought into contact with a restricted volume of air therein, whereby the amount of air present is quickly converted into inert gases; then causing a cyclic flow of such gases through a gas cooler, and through such receptacle; continuing the gas circulation until the temperature of the charcoal has dropped to a point where the charcoal does not readily inflame in diluted air; then progressively introducing some air into the cyclic gas current while continuing to lower the temperature of the charcoal; until substantially pure air is present in the system, and the charcoal is still warm but below its inflammation temperature; and continuing the aeration of the charcoal with substantially pure air while such charcoal is maintained at above normal room temperature but below kindling temperature, until it is aged and stable.

6. A process which comprises agitating a mass of hot charcoal in a cooled current of inert gas and thereafter slowly substituting gas containing oxygen for said inert gas.

7. A process which comprises tumbling a mass of finely-divided hot charcoal in a cooled current of inert gas and thereafter slowly substituting gas containing oxygen for said inert gas.

8. In cooling charcoal, the improvement which comprises subjecting hot charcoal to contact with a cooled inert gas, until its temperature has fallen somewhat, then gradually substituting air for such inert gas.

9. A process which comprises agitating a mass of hot charcoal in a cooled current of inert gas consisting largely of an oxid of carbon and nitrogen until the temperature of the charcoal has fallen considerably, and then gradually substituting gas containing oxygen for the said inert gas.

In testimony whereof I affix my signature.

ORIN F. STAFFORD.